(12) United States Patent
Knotts (10) Patent No.: US 6,985,748 B2
(45) Date of Patent: Jan. 10, 2006

(54) INTER-CARRIER MESSAGING SERVICE PROVIDING PHONE NUMBER ONLY EXPERIENCE

(75) Inventor: Chris Knotts, Glen Burnie, MD (US)

(73) Assignee: TeleCommunication Systems Inc., Annapolis, MD (US)

( * ) Notice: Subject to any disclaimer, the term of this patent is extended or adjusted under 35 U.S.C. 154(b) by 113 days.

(21) Appl. No.: 10/720,343

(22) Filed: Nov. 25, 2003

(65) Prior Publication Data

US 2004/0198351 A1    Oct. 7, 2004

Related U.S. Application Data

(63) Continuation of application No. 09/985,032, filed on Nov. 1, 2001, now Pat. No. 6,658,260.

(60) Provisional application No. 60/316,973, filed on Sep. 5, 2001.

(51) Int. Cl.
*H04Q 7/20* (2006.01)
(52) U.S. Cl. ................. 455/466; 455/552.1; 455/412.1
(58) Field of Classification Search ............ 455/412.1, 455/412.2, 435.1, 550.1, 417, 552.1, 432.3, 455/466, 553; 379/100.13, 100.15, 93.15; 370/352, 355, 356, 395.5, 395.52, 401; 709/206, 709/238
See application file for complete search history.

(56) References Cited

U.S. PATENT DOCUMENTS

| | | | |
|---|---|---|---|
| 5,606,595 | A | 2/1997 | Ejzak |
| 5,887,249 | A | 3/1999 | Schmid |
| 5,915,222 | A | 6/1999 | Olsson et al. |
| 5,920,822 | A | 7/1999 | Houde et al. |
| 5,946,629 | A | 8/1999 | Sawyer et al. |
| 5,946,630 | A | 8/1999 | Willars et al. |
| 6,041,045 | A | 3/2000 | Alterman et al. |
| 6,085,100 | A | 7/2000 | Tarnanen |
| 6,208,870 | B1 | 3/2001 | Lorello et al. |
| 6,230,009 | B1 | 5/2001 | Holmes et al. |

(Continued)

FOREIGN PATENT DOCUMENTS

WO    WO 96/21999    7/1996

(Continued)

OTHER PUBLICATIONS

Telephone Number Portability is a Regulatory Imperative in Many Countries, Phillips Business Information, Jul. 11, 2000.

*Primary Examiner*—Jean Gelin
(74) *Attorney, Agent, or Firm*—William H. Bollman (57) ABSTRACT

A phone number only messaging experience is provided in an Inter-Carrier Short Messaging System (IC-SMS) service. Subscriber to subscriber messages are routed between carrier's networks using an Inter-Carrier messaging module with appropriate MIN/carrier/carrier routing look-up capabilities. Short messages may be sent to a subscriber in another carrier's network addressed only with a phone number. If the recipient is outside of the sender's carrier network, the Inter-Carrier messaging module of the Inter-Carrier service provider (ICSP) determines the appropriate carrier for the recipient, appends the appropriate syntax to the short message to allow internet protocol (IP) or other standardized communication techniques between SMSCs of the two carriers, and routes the short message to the destination carrier. The recipient in the other carrier's network may reply back to the ICSP's sender using only the subscriber's directory number.

19 Claims, 9 Drawing Sheets

U.S. PATENT DOCUMENTS

| | | |
|---|---|---|
| 6,370,390 B1 | 4/2002 | Salin et al. |
| 6,393,014 B1 | 5/2002 | Daly et al. |
| 6,400,942 B1 | 6/2002 | Hansson et al. |
| 6,535,746 B1 | 3/2003 | Yu et al. |
| 2001/0006897 A1 | 7/2001 | Kang et al. |
| 2002/0029189 A1 | 3/2002 | Titus et al. |
| 2002/0112014 A1 | 8/2002 | Bennet et al. |

FOREIGN PATENT DOCUMENTS

| | | |
|---|---|---|
| WO | WO 96/26616 | 8/1996 |
| WO | WO 97/26765 | 7/1997 |
| WO | WO 98/35481 | 8/1998 |
| WO | WO 98/56195 | 12/1998 |
| WO | WO 99/63772 | 9/1999 |
| WO | WO 01/50787 | 7/2001 |
| WO | WO 01/54434 | 7/2001 |
| WO | WO 01/78422 | 10/2001 |

| ALL MINs | CARRIER NAME | ID | |
|---|---|---|---|
| 410 555 1212 | AT+T | 1 | ← 310 |
| 410 123 4567 | VERIZON | 2 | ← 320 |
| 212 654 3210 | SPRINT | 3 | ← 330 |
| ⋮ | ⋮ | | ← 340 |

302 — 304 — 110

EXEMPLARY MIN / CARRIER DATABASE

| CARRIER NAME | CURRENT COMMUNICATION METHOD | SYNTAX OF SHORT MESSAGE | |
|---|---|---|---|
| AT+T | SMTP | @mobile.att.net | ←488 |
| VERIZON | SMTP | @mobile.myportal.xyzwireless.net | ←489 |
| ⋮ | ⋮ | ⋮ | |

EXEMPLARY CARRIER ROUTING TABLE

INTER-CARRIER MESSAGING SERVICE PROVIDING PHONE NUMBER ONLY EXPERIENCE

This application is a continuation of Ser. No. 09/985,032 filed on Nov. 1, 2001 now U.S. Pat. No. 6,658,260 claims priority from U.S. Provisional Application No. 60/316,973, filed Sep. 5, 2001, entitled "Internet Protocol (IP) Based Inter-Carrier Messaging Service", the entirety of which is expressly incorporated herein by reference.

BACKGROUND OF THE INVENTION

1. Field of the Invention

This invention relates generally to wireless carriers, Internet service providers (ISPs), and information content delivery services/providers. More particularly, it relates to short message service (SMS) messaging services provided between different carriers and/or between subscribers in different air interface standards.

2. Background of Related Art

We are now in what is called the information age. More than ever, the exchange of information, and the ability to do the same, has become an important technical necessity of modern society. With the introduction and now wide usage of the Internet, and the advances in telecommunications, a variety of means for exchanging information have proliferated to bring a great number of people together through the exchange of information.

In the early 1990s, as a result of the growing popularity of digital wireless technology, a standard for digital wireless networks was introduced in Europe. That standard, now known as the global standard for mobiles (GSM), included a service called short messaging service (SMS). One way in which information is exchanged is through short messages. A short message is typically a textual message, e.g., a paging message, e-mail or a voice mail message passed to and/or from various types of communication devices, e.g., cellular telephone handsets, telephones or computers with appropriate modems.

An SMS allows transmission of short messages, typically up to 160 characters, to and from communication devices, e.g., cellular telephone handsets, telephones or computers with appropriate modems. In North America, the SMS is currently implemented on digital wireless/mobile networks, such as a PCS network based on the GSM standard, code division multiple access (CDMA) and/or time division multiple access (TDMA) methods. Short message services are gaining in popularity, particularly in the United States.

Short message services are advantageous over text based paging services because of the capability of bi-directional communication. Such bi-directional communication allows, for example, notification to the originating device of the success or failure of the short message delivery.

Each SMS network typically includes a Short Message Service Center (SMSC) which acts as a store-and-forward mechanism providing guaranteed delivery of short messages to a subscriber, even if the subscriber is inactive when the message was transmitted, by delivering the short messages once the subscriber becomes active. Delivery of all short messages is guaranteed regardless of whether or not the intended subscriber is "on-line" because the transmitted short message is stored within the one SMSC assigned to each intended subscriber, and delivered to the intended subscriber from their assigned SMSC when the subscriber becomes available.

A variety of services have been introduced using SMS networks including, for example, integrated electronic mail and fax, integrated paging, interactive banking, and information services such as stock quotes and airline schedule delivery.

In operation, an SMSC receives a short message from any source intended to be delivered to a particular subscriber. When the intended subscriber is not available because, for example, it is turned off or is outside of the service area of the SMS network, the attempt to deliver the short message at that time will fail. In this case, the short message will be retained in the SMSC assigned to that intended subscriber for a later delivery attempt. Thereafter, when the subscriber finally becomes available, e.g., is turned on or has moved into the service area of the SMS network, the relevant portions of the network (e.g., the mobile servicing center (MSC) and the home location register (HLR)) notify the SMSC to initiate delivery of the stored (i.e., previously failed) short messages.

Figure 9:
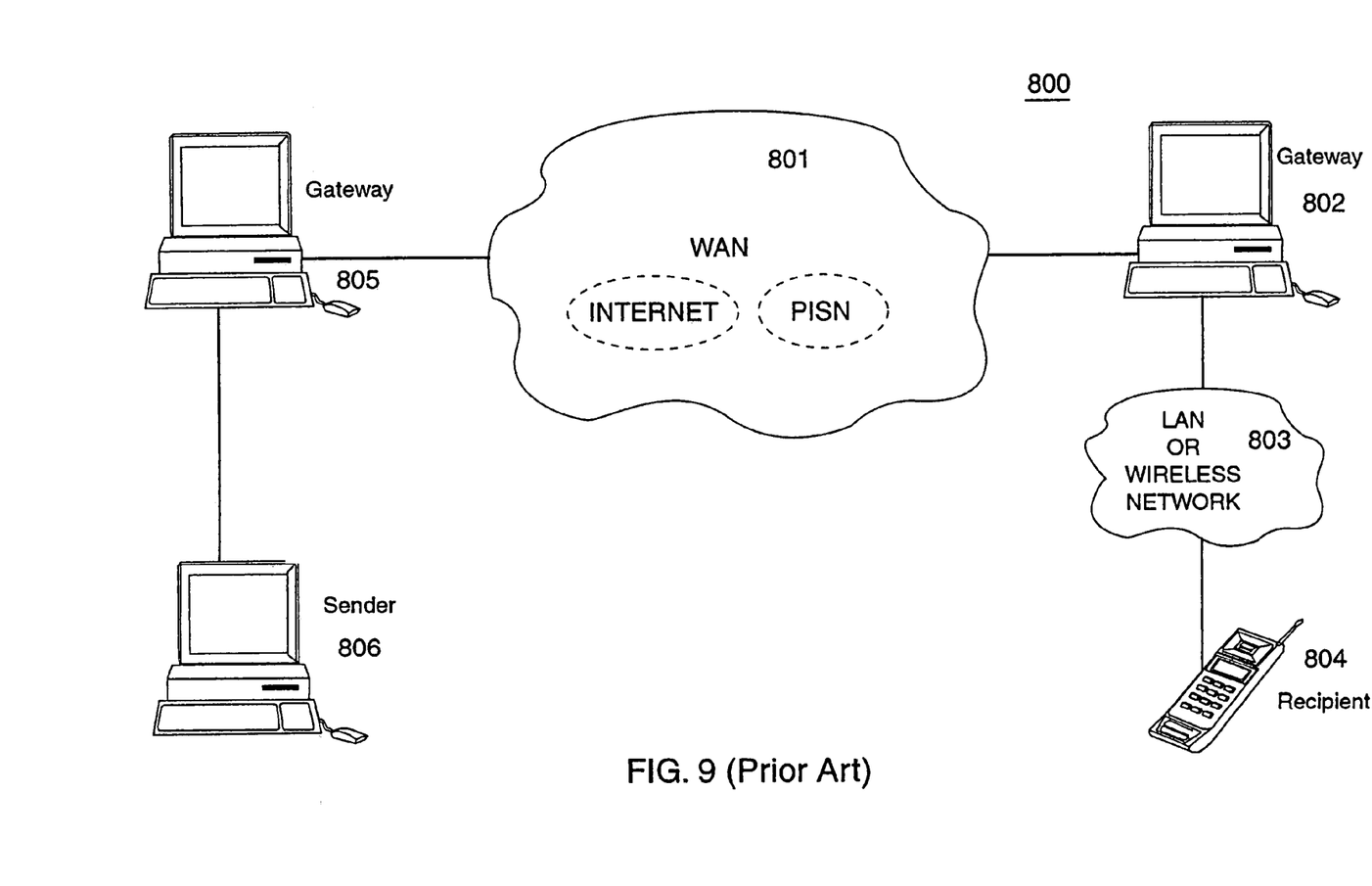
FIG. 9 shows a general example of a short message exchange network.

FIG. 9 shows a general example of a short message exchange network. In particular, in FIG. 9, a text message is communicated between a first communication device (i.e., sender 806) and a second communication device (i.e., recipient 804). The sender 806 accesses a wide area network (WAN) such as the Internet or the Public Telephone Switching Network (PTSN). The short message from the sender 806 via gateway 805 is delivered to the recipient 804 via, e.g., a gateway 802 and a local area network (LAN) and/or wireless network 803.

Although the recipient 804 is shown as being a mobile phone handset, the recipient 804 may comprise, e.g., a computer device connected either through the LAN 803 or via a direct modem connection to the WAN (e.g., PTSN or the Internet) 801.

An example of a wireless short message exchange network is described in co-owned U.S. Pat. No. 6,208,870, entitled "SHORT MESSAGE SERVICE NOTIFICATION IN MULTIPLE SERVICE CENTER SHORT MESSAGE SERVICE NETWORK", the entirety of which is explicitly incorporated herein by reference.

An SMSC is a core short messaging router, which connects to the SS7 public network. An SMSC provides phone-to-phone two-way messaging within that carrier's network, either mobile originated or mobile terminated. To provide the ability for the SMSC to communicate over the web, a Wireless Internet Gateway (WIG) is added to the carrier's network. While an SMSC does have a direct Internet Protocol (IP) interface (i.e., Short Message Peer-to-Peer (SMPP)), a WIG acts as a multi-protocol router by typically adding, e.g., six or more additional carrier-class interfaces. A WIG provides an IP based door into a carrier's network.

SMPP is typically used to provide direct communications between SMSCs. Other direct communication links used between SMSCs include CDMP, which is MOTOROLA™ proprietary, and OIS, another proprietary protocol.

A suitable and appropriate WIG is shown and described in co-pending U.S. application Ser. No. 09/630,762, entitled "Wireless Internet Gateway", filed Aug. 2, 2000, the entirety of which is explicitly incorporated herein by reference.

A well known example of a system which delivers short messages is an electronic mail system, commonly referred to as e-mail. E-mail enables a sender to exchange information with a recipient from their respective communication devices, e.g., typically two remotely located computer devices.

Mobile devices such as wireless phones provide limited e-mail services. Wireless phones are designed to accept phone numbers quite easily, but are somewhat cumbersome when required to accept an alphanumeric e-mail address. When communicating between phone on different networks, subscribers must address messages to an e-mail address when communicating from phone-to-phone within the same network, only the phone number is required. Thus, text messages between wireless phones is generally limited in the United States to between subscribers within a common carrier's wireless network.

With current systems, Inter-Carrier e-mail messaging (i.e., between different carrier networks) from wireless devices requires input of a complete e-mail address. In particular, for a subscriber of a first carrier ("Carrier A") to send a message to a subscriber of another carrier ("Carrier B"), the subscriber of Carrier A must know and input a full e-mail address of the destination device.

Exemplary full e-mail addresses typically comprise a phone number, the "@" sign, and then a unique domain name used specifically for SMS messaging. An exemplary full e-mail address is 4105551234@mobile.myportal.xyzwireless.net. A phone number only experience can be provided to the subscriber of Carrier A only when sending an SMS message (e.g., e-mail) to a subscriber of the same Carrier A.

As an example, mobile terminated short messaging is currently available through web-page based services. For instance, VERIZON WIRELESS™ currently maintains a web page for use only by VERIZON WIRELESS™ customers. Using this web page based approach, a user inserts a phone number of a known Verizon customer, types in a body of the desired message, and clicks on an enter key. However, this technique is available for mobile termination (not mobile originated) short messages only. Moreover, the sender must by default know to go to the Verizon web page, and thus have advance knowledge of the particular carrier servicing a particular phone number.

Mobile originated short messaging is also available, but is cumbersome to the user and does not provide a phone number only experience. In particular, to send a mobile originated short message, the sender must enter a phone number in their wireless phone, but the subscriber's network will be capable of sending an associated short message only to other subscriber's within the same carrier's network. To send the short message to a subscriber serviced by another carrier's network, the subscriber must enter a complete alphanumeric e-mail address via their mobile phone (e.g., 4105551212@mobile.att.net). As discussed, entry of a lengthy list of alphanumeric characters via an alphanumeric keypad on a mobile phone is cumbersome at best, particularly since several letters are represented on any particular key, and some letters in the alphabet are not represented at all on the alphanumeric keypad.

Unfortunately, using this mobile originated technique, a sender must know beforehand: (1) Whether or not the subscriber is in fact on another network (thereby requiring a full e-mail address instead of just a phone number for in-carrier subscribers); and (2) The exact format address syntax of a phone number on the recipient's network (e.g., "@mobile.att.net".

Most carriers in other parts of the world enjoy common technologies with adjacent carriers. For instance, most carriers in Europe have a wireless network conforming to the GSM standards. Accordingly, interconnection between SMSC's from different carriers is simple and straight forward because they all use the same air interface (i.e., GSM). Thus, native SMS Inter-Carrier messaging may be accomplished through direct carrier-to-carrier interconnections.

Accordingly, there is no technical barrier to interconnectivity, and a phone number only experience may be provided to these GSM system subscribers using native SMS Inter-Carrier messaging which is accomplished through direct carrier-to-carrier interconnections.

Unfortunately, the interconnection of like air interface technologies (such as GSM) is not generally an option in the US. In the US, each major US carrier has deployed a different, competing air interface technology (e.g., CDMA, TDMA, GSM, I-DEN (a spin-off of GSM, Motorola™ proprietary), Reflex (paging networks), etc.) There are approximately ten (10) different air interface technology protocols currently in use in the United States. While this technology dispersion allows carriers to differentiate their service offers from one another, the US consumer suffers inconvenience because of the lack of standardization and/or interoperability across networks.

Not only is the variety of air interface technologies an integration challenge in the United States (many carriers espouse the superiority of their particular air interface technology over those provided by competitors), but roaming agreements for voice and SMS traffic must be reached by all potential recipients of a short message. In Europe, roaming agreements between European countries are routinely established because of the commonality of the air interface technologies (and lack of 'technical superiority' claims by competitors).

Practically speaking, most people remember or note down the mobile phone number of desired people to call. However, most people have no knowledge of the exact carrier with which those desired people to call are serviced by. Without remembering the identity of the person's carrier, a subscriber has great difficulty in determining a full e-mail address for that person. Without changing US society to remember not only phone numbers of others but also which carrier each of the others are with, e-mail messaging between subscribers of different carriers will find adoption to be slow.

There is a need for providing subscribers of wireless carriers in the United States a phone number only experience, to facilitate and ensure the adoption and popularity of SMS messaging in general, and e-mail messaging in particular, in a mobile environment.

SUMMARY OF THE INVENTION

In accordance with the principles of the present invention, in a message distribution center, a phone number only experience is provided by a database associating subscriber MIN numbers with servicing carriers, and a database associating carriers with routing syntax. An inter-carrier messaging module receives a short message addressed with only a MIN number, performs a lookup in the database associating subscriber MIN numbers and in the database associating carriers with routing syntax, and adds routing syntax determined from the lookup to the MIN number.

A method of providing a phone number only experience to a subscriber in accordance with another aspect of the present invention comprises receiving an initial short message addressed to a MIN only, and associating a carrier providing service to the MIN. A new short message is formulated including a body of the initial short message and newly addressed to the MIN with a syntax associated with the carrier providing service to the MIN. The new short message is routed.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a phone number only messaging experience to subscribing customers using native SMS Inter-Carrier Messaging, i.e., "phone number only" messaging, as opposed to e-mail-based messaging.

An Inter-Carrier Short Messaging System (IC-SMS) service in accordance with the principles of the present invention allows short messages to be sent between networks of different technologies using only a phone number. Subscriber to subscriber messages are routed between carrier's networks by a service bureau or similar function provided by the use of an Inter-Carrier messaging module with appropriate MIN/carrier/carrier routing look-up capabilities.

In operation, a subscriber of the service providing an Inter-Carrier messaging module may send a mobile originated (MO) short message, addressed only with a phone number, to a subscriber in another carrier's network. If in-network, the message is routed in SMSC. If not in-network, the message is sent to the ICM module. The service's Inter-Carrier messaging module determines that the destination address of the message is not a subscriber in the sender's same network. The Inter-Carrier messaging module of the Inter-Carrier service provider (ICSP) determines the appropriate carrier for the recipient, appends the appropriate syntax to the short message to allow internet protocol (IP) or other standardized communication techniques between SMSCs of the two carriers, and routes the short message to the destination carrier. Once received, the destination carrier's network delivers the message to the final destination.

Furthermore, the present invention preferably allows the recipient in the other carrier's network to reply back to the ICSP's sender back to the sender using only the subscriber's directory number. This assists in the provision of a phone number only experience by the ICSP's subscriber.

The Inter-Carrier messaging module may store an instance of the expectation of a reply from the recipient (e.g., for a given period of time) to allow phone number only reply's, but it is preferred that the Inter-carrier messaging module simply recognize the intended recipient of a reply as being within the network of the ICSP, and effectively strip off any email syntax from the telephone number before forwarding the reply short message back to the original sender.

A Message Distribution Center (MDC) including an Inter-Carrier messaging module in accordance with the principles of the present invention empowers message providers (e.g., carriers, enterprises, web developers, content providers, etc.) with a single point of entry for the transaction of SMS messaging to a wide array of wireless networks.

The MDC including the Inter-Carrier messaging module preferably includes a carrier-grade Wireless Internet Gateway (WIG) such as the one shown and described in U.S. patent application Ser. No. 09/630,762, filed Aug. 2, 2000 by Richard Smith, the entirety of which is expressly incorporated herein by reference) in a hosted environment (e.g., a service bureau).

An MDC Inter-Carrier SMS Service in accordance with the principles of the present invention provides a short message clearinghouse providing subscribers with a capability that will enhance their communications freedom through seamless, simple SMS messaging to other subscribers, regardless of the destination network.

An Inter-Carrier Messaging Service in accordance with the principles of the present invention is a value-added service of the MDC that allows carriers to offer their subscribers a "phone number only" messaging experience regardless of the destination network. The MDC Inter-Carrier Messaging Service provides protocol translation and messaging routing service for all SMS messages terminating to addresses outside the sender's network. Additionally, the service may extend preferably the phone number only experience to mobile terminated messages that are a result of a "reply" to a short message originated by a subscriber in the network, as well as short messages originating from other carriers/operators participating in the MDC Inter-Carrier Messaging Service.

Figure 1:
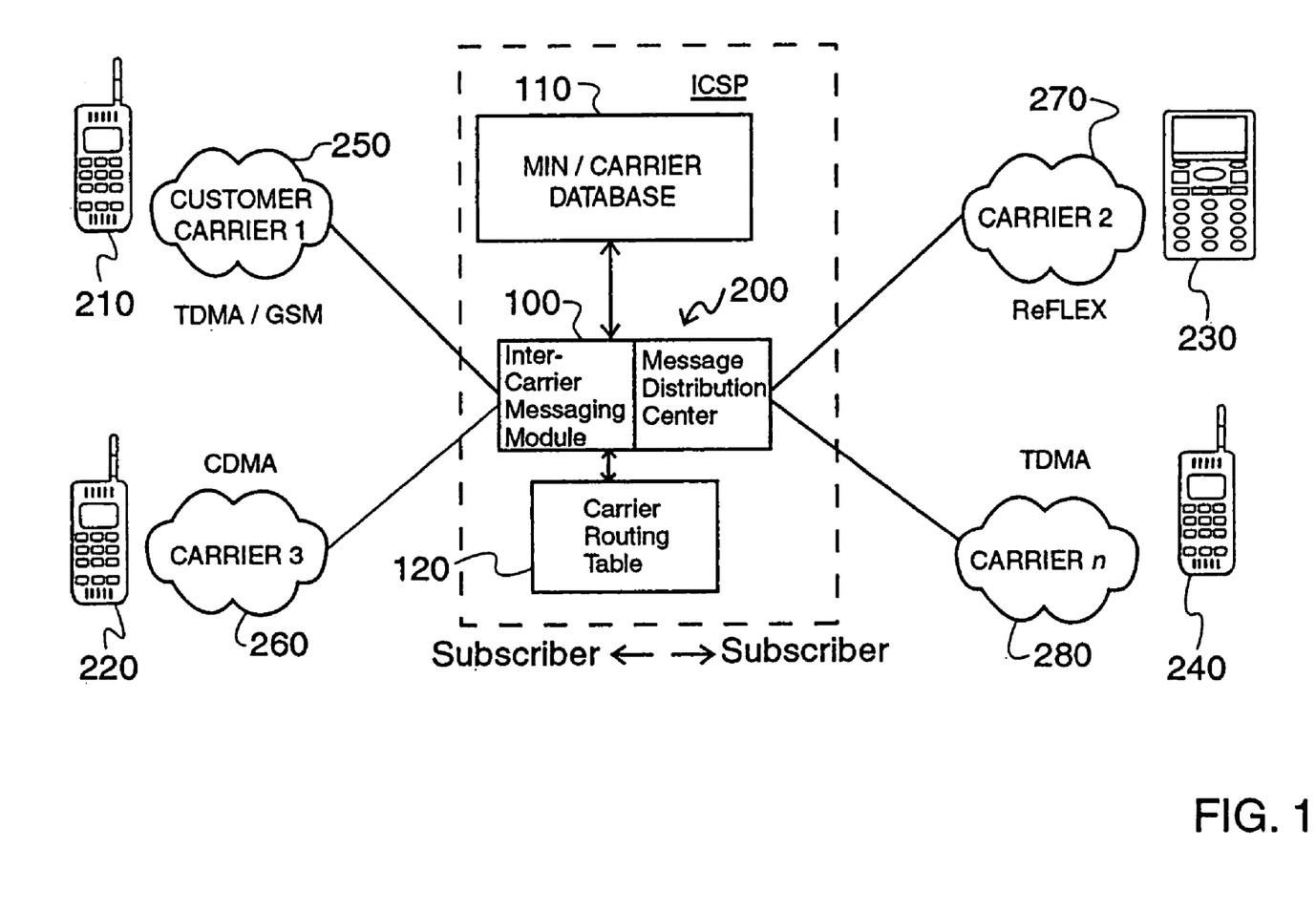
FIGS. 1 and 2 depict a Message Distribution Center (MDC) including an Inter-Carrier Messaging module including a MIN/Carrier Database and a Carrier Routing Table to provide a subscriber with "phone number only" short messaging capabilities, in accordance with the principles of the present invention.
Figure 2:
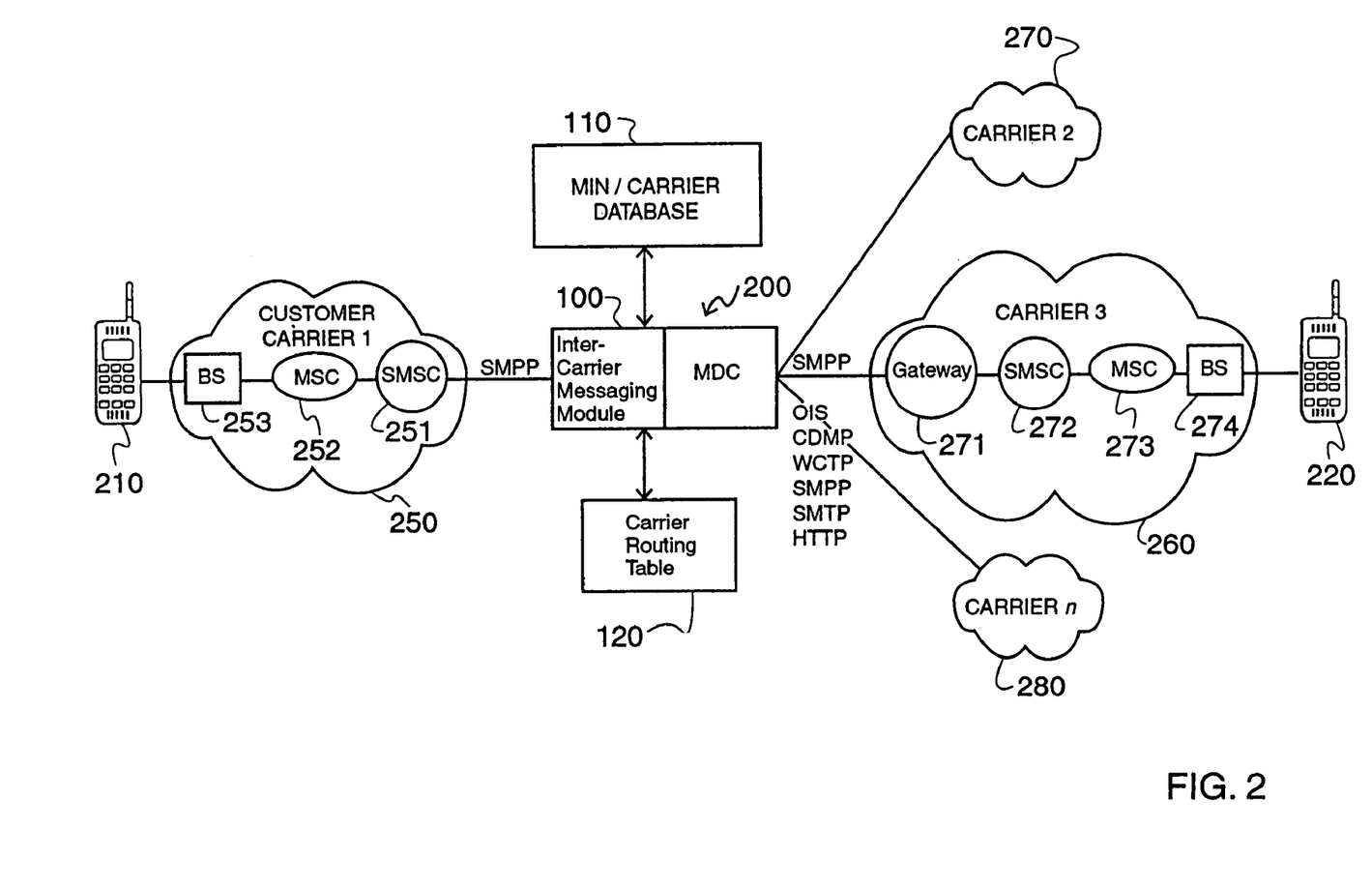

FIGS. 1 and 2 depict a Message Distribution Center (MDC) including an Inter-Carrier Messaging module including a MIN/Carrier Database and a Carrier Routing Table to provide a subscriber with "phone number only" short messaging capabilities, in accordance with the principles of the present invention.

In particular, as shown in FIGS. 1 and 2, the MDC acts as a clearinghouse for message transactions between carrier networks.

Communication between a carrier's network and the MDC may be through the Short Message Peer to Peer (SMPP) protocol. The MDC preferably fully supports SMPP 3.3 and 3.4 as well as other SMSC interface protocols such as CDMP (Motorola proprietary), OIS (Sema proprietary), SNPP (paging operators) and WCTP (paging operators).

In FIG. 1, an MDC 200 includes an Inter-Carrier messaging module 100, MIN/Carrier database 110, and Carrier Routing Table 120, in accordance with the principles of the present invention. The Inter-Carrier messaging module 100 enables phone number only short messaging between a subscriber's carrier 1 250 which subscribes to (or owns/maintains) the Inter-Carrier service provider (ICSP) providing the Inter-Carrier messaging module 100, and subscribers 220, 230, 240 of other carrier's networks 260, 270, 280, respectively.

FIG. 2 shows exemplary communication protocols between the subscriber's carrier 1 250, using e.g., SMPP, and a recipient's carrier 3 260, using e.g., SMPP, OIS, CDMP, WCTP, SMTP, and/or HTTP. The subscriber's carrier 1 250 includes an SMSC 251, MSC 252, and BS 253. Carrier 3 260 includes a Wireless Internet Gateway 271 providing access (e.g., IP protocol access) to an SMSC 272, MSC 273, and base station BS 274.

With respect to interoperability, at the heart of the Message Distribution Center 200 is the carrier-proven technology of a Wireless Internet Gateway (WIG) such as that shown and described in U.S. application Ser. No. 09/630,762.

The Wireless Internet Gateway passes text messages between the Internet (via HTTP, SMTP, and other common Internet protocols) and a carrier's Short Message Service Center (SMSC). The WIG is currently operational in many carrier networks worldwide interoperating with SMSCs that support SMPP, CDMP, and/or OIS protocols.

Figure 3:
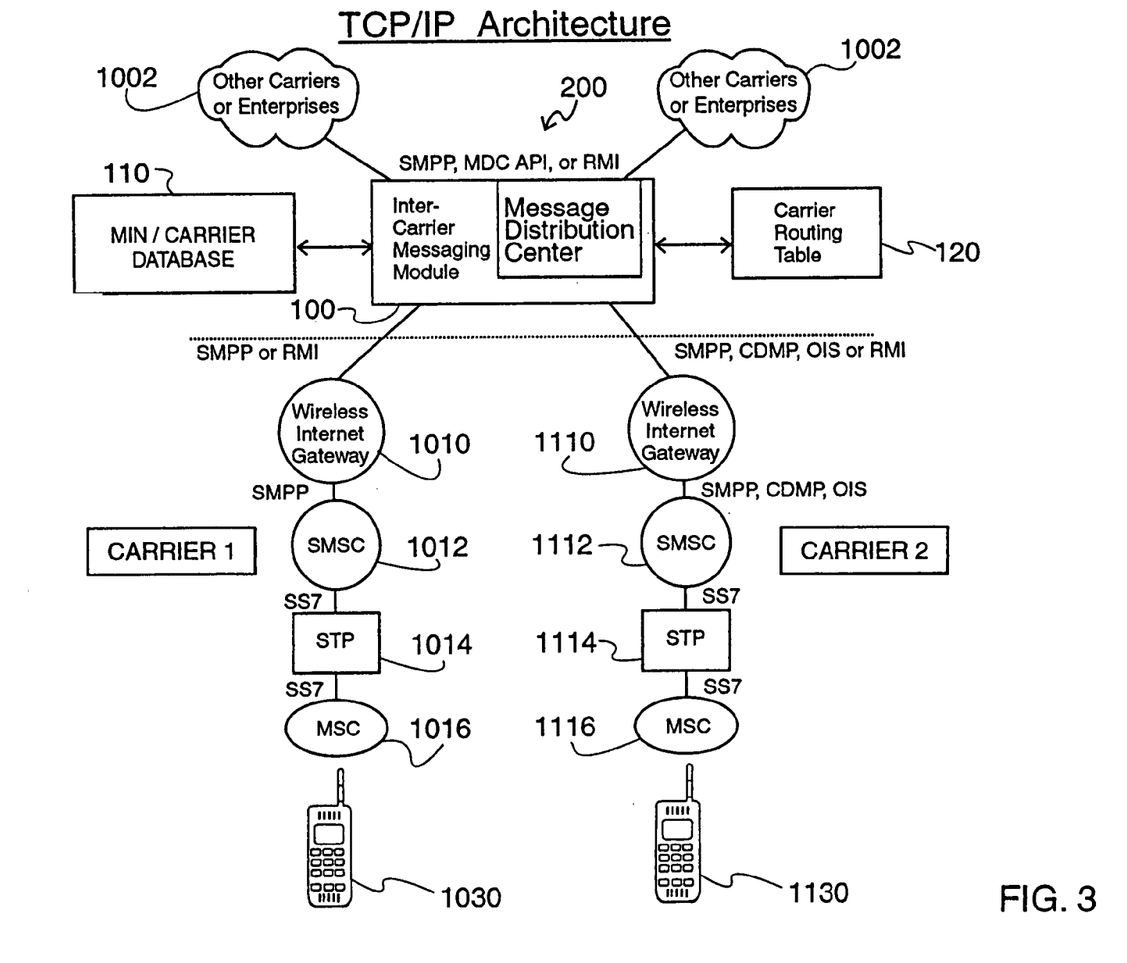
FIG. 3 shows exemplary interconnections between the MDC including an Inter-Carrier messaging module, and other carrier's networks using TCP/IP protocols, in accordance with the principles of the present invention.

FIG. 3 shows exemplary interconnections between the MDC including an Inter-Carrier messaging module, and other carrier's networks using TCP/IP protocols, in accordance with the principles of the present invention.

In particular, as shown in FIG. 3, one communication method between the MDC 200 and a carrier is via SMPP or RMI, as depicted by Carrier 1, which includes a Wireless Internet Gateway 1010, SMSC 1012, STP 1014, and MSC 1016. This communication technique does not require a carrier agreement between the sending carrier and the receiving carrier, and is very fast to market.

Alternatively, as depicted by carrier 2 in FIG. 3, an SMPP, CDMP, OIS or RMI protocol communication path may be used between the MDC 200 and the Wireless Internet Gateway 1110 of the other carrier. In such a case, the Wireless Internet Gateway 1110 would use SMPP, CDMP or OIS protocol communications with the SMSC 1112 of that carrier 2. The SMSCs 1012, 1112, STPs 1014, 1114, and MSCs 1016, 1116 utilize SS7 protocols. This second type carrier network supports 1-way SMS, is capable of providing a 2-way SMS, and no protocol conversion is required.

The Message Distribution Center 200 is a store and forward messaging platform. The disclosed MDC 200 utilizes a store and forward approach to assure message delivery, complete message tracking, and maximum billing flexibility.

Most SMS service providers currently operate using open SMTP or HTTP gateways. The MDC 200 preferably provides inside-the-network connectivity with all the major domestic carriers and as many tier 2 and 3 carriers as is feasible.

Where inside-the-network connections are unavailable, it is preferred that open SMTP and HTTP gateway connections to carriers be used.

Preferably, the MDC 200 supports message routing to Tier 2, Tier 3 and paging operators.

Custom control methods may be implemented to enable the MDC 200 to restrict incoming and outgoing messages to other carrier networks. These methods would allow the MDC 200 to turn incoming and/or outgoing messaging "off" on a carrier by carrier basis. Specific bounce rules and error messages, as well as related reporting requirements, may be defined by the operator of the MDC 200.

In addition to the above, one or more categories of "anti-spam" functionality may be defined to allow the MDC 200 to control the flow of particular unsolicited messages, either from a single source (e-mail address) or a single domain (e.g. msn.com). The MDC 200 can restrict messages based on the following criteria a) number of allowable messages sent to a MIN in a given period of time b) number of messages sent from a particular source, including e-mail address or IP number, and c) messages with a particular subject field (e.g. "I LOVE YOU").

In the disclosed embodiments, seven different interface methods are provided by which SMS messages can be transmitted to wireless and paging carriers including SMTP, HTTP, Win Socket connection, XML Remote Procedure Calls, SMPP and WCTP.

SMTP (Simple Mail Transport Protocol)

For developers interested in transmitting text messages using the SMTP e-mail protocol, this capability may be provided in an easy to use format. Simplicity is the benefit of this access method. Functionality, however, is limited. This method does not allow developers to take full advantage of the Application Programming Interface (API)'s capability to track a message's status or set expiration time. For more advanced capabilities, developers must utilize one of the other interface methods.

HTTP (Hypertext Transport Protocol)

Messages can also be distributed to wireless devices by submitting various parameters for the MIN, text message, login, password, etc. to a URL. Messages can be transmitted using Secure Socket Layer (SSL) for secure transmission to the MDC. Responses to HTTP posts can be returned in either standard Hypertext Markup Language (HTML) or Extensible Markup Language (XML) for easier data manipulation.

Win Socket Command Line

Developers may choose to interface with the MDC through a robust Win Socket Command Line interface that provides them with complete access to the full power of the MDC's API via a Telnet session.

XML-RPC (Extensible Markup Language-Remote Procedure Calls)

XML programmers will be familiar with the XML Remote Procedure Call (XML-RPC) interface to the API. The XML-RPC interface may be imbedded within an application and messages may be "posted" using the XML-RPC specifications.

SMPP-Short Message Peer-to-Peer

The Short Message Peer to Peer protocol is an open industry standard messaging protocol designed to simplify integration of data applications with wireless mobile networks. The protocol is widely deployed in the mobile telecommunications industry. Currently, the MDC supports limited SMPP functionality with complete support for SMPP 3.4 scheduled for release in Q3 2001.

SNPP-Simple Network Paging Protocol

The Simple Network Page Protocol is a paging industry standard messaging protocol designed to simplify integration of data applications with paging networks. The protocol is widely deployed within the paging industry.

WCTP-Wireless Communications Transfer Protocol

The Wireless Communications Transfer Protocol (WCTP) is specifically aimed at creating an easy means of passing alphanumeric and binary messages to and from wireline systems and two-way capable wireless devices. Although introduced through the paging industry, WCTP is directly applicable for messaging to and from most other wireless technologies including PCS, GSM, and cellular.

Preferably, the MDC supports Deliver_SM and Submit_SM operations for SMPP specification versions 3.4 and 3.3, and similar operations in future versions of SMPP, e.g., SMPP version 5.0.

The MDC's current production capacity is 80 to 100 messages/second. At the core of the MDC's architecture is a Wireless Internet Gateway (WIG). The WIG is a highly scalable and available carrier grade product. Preferably, the WIG architecture allows the addition of additional WIGs (as well as other network components) to increase capacity on an as-needed basis. Usage capacity may be monitored and additional capacity may be added on an as needed basis.

Statistics used to determine latency times for the MDC include the entire time period from when a message is first received by the MDC until the time the MDC receives an acknowledgement that the carrier has received the message. Given that assumption, the minimum latency of the disclosed MDC is under one second, and the average latency is approximately 2.5 seconds. The maximum latency of the MDC is essentially irrelevant because the longest latencies typically occur in situations where the destination carrier's gateway is unavailable for a period due to problems with the carrier network. In this situation, the MDC continues to retry sending the message until the message expires (a configurable parameter) or until the carrier's gateway becomes available.

Multiple carrier-class Network Operating Centers (NOCs) may be maintained throughout the country, connected via redundant T-1s and having mirrored applications and servers at each location.

The primary components of the MDC's application software functions include protocol stacks and other interface methods that accept messages from outside sources. Supported input protocols and access methods include SMPP, SMTP, HTTP, WCTP, XML-RPC, and a proprietary command line interface accessible via a TelNet session. Other components include message provider validation and message tracking and billing functions, MIN destination validation functions; message queuing functions, message routing to destination carriers based upon MIN ranges, and outgoing message transmission to destination carriers (including message throttling based upon destination carrier's specifications).

It is preferred that most software be written in Java language, enabling portability and reuse across numerous operating environments. The software design is also preferably modular, to take advantage of Remote Method Invocation (RMI). RMI enables various components to be distributed across servers increasing system performance by spreading processing power across different physical servers. Furthermore, it is preferred that the software be object oriented and multi-threaded. A suitable database engine may be that commercially available from ORACLE™, to provide strong performance, high availability, and scalability.

Figure 4:
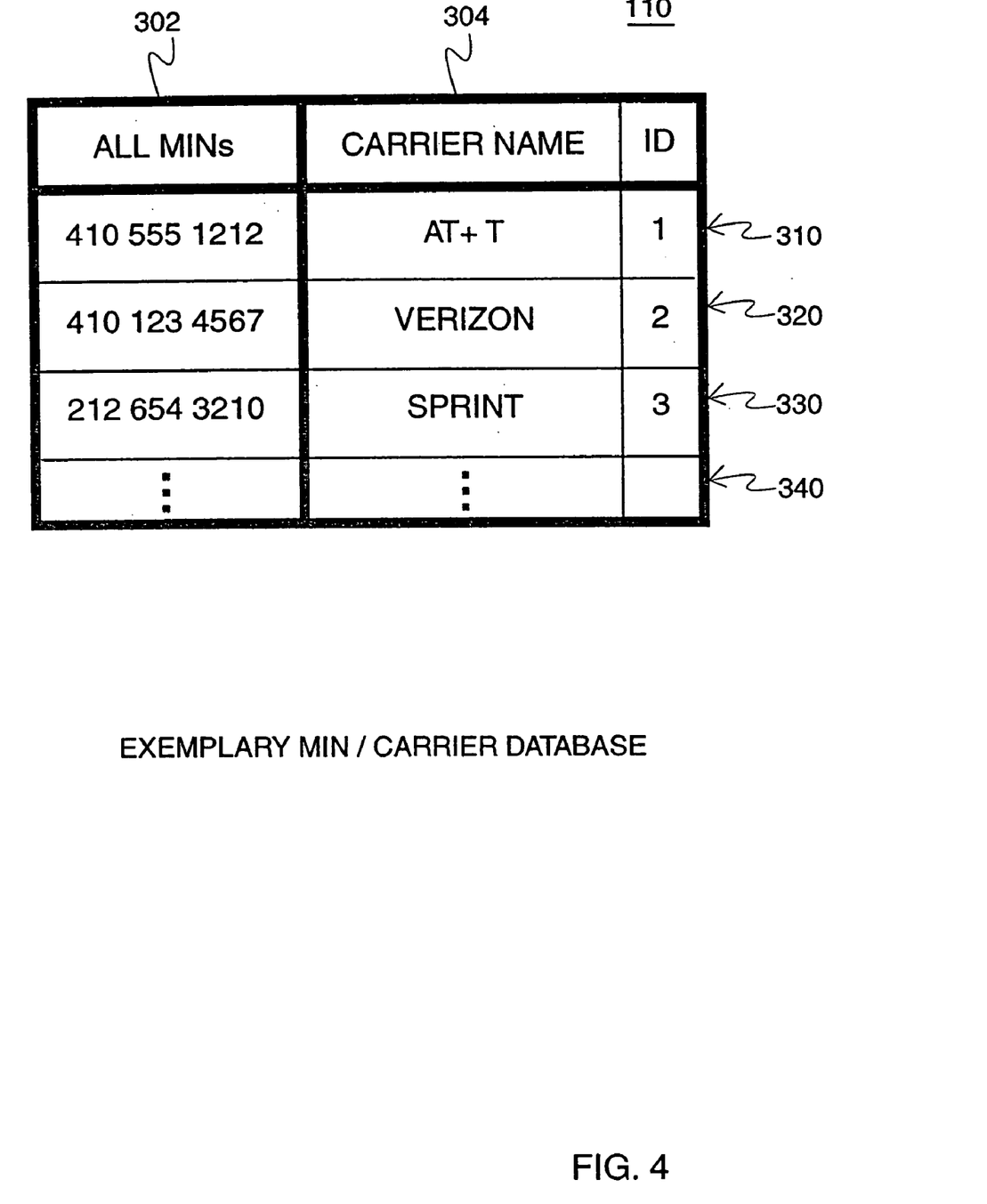
FIG. 4 shows exemplary entries in an exemplary Mobile ID Number (MIN)/Carrier Database shown in FIGS. 1 and 2.

FIG. 4 shows exemplary entries in an exemplary Mobile ID Number (MIN)/Carrier Database 110 shown in FIGS. 1 and 2.

In particular, as depicted in FIG. 4, a first entry 310 includes an association between the MIN (i.e., phone number) 410-555-1212, and its carrier, AT&T™. The second entry 320 indicates that the phone number 410-123-4567 is serviced by Verizon™, and the third entry 330 indicates that a fourth MIN 212-654-3210 is serviced by Sprint™.

Preferably, the entries in the MIN/Carrier database may encompass a great majority of all MINs. For instance, in the preferred embodiment, the MIN/Carrier database 110 is filled with information from the FCC mandated Local Exchange Registry (LER) which currently includes approximately 85% of the MINs in use in the United States. Of course, those MINs may be augmented as necessary or desired with MINs not otherwise in the LER, within the principles of the present invention.

Figure 5:
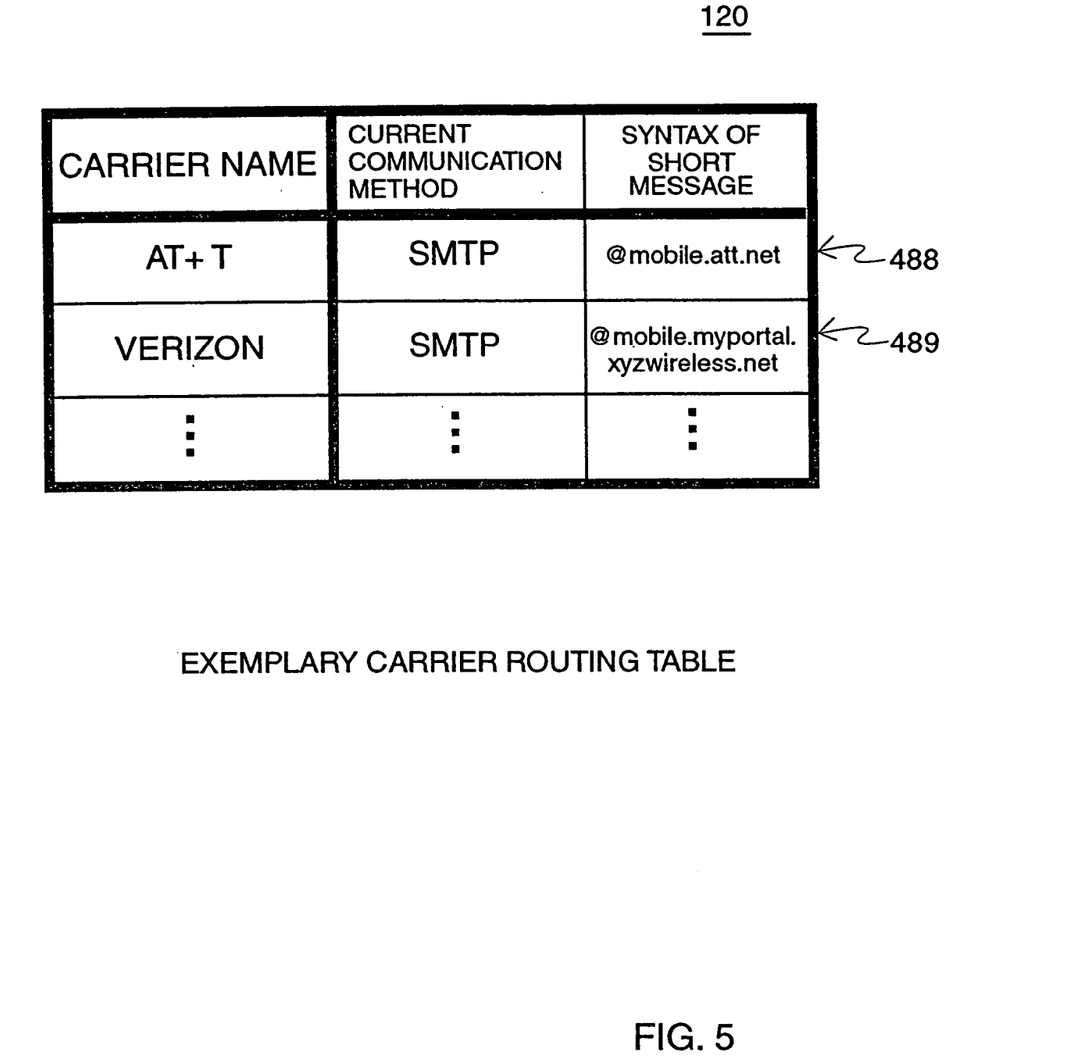
FIG. 5 shows exemplary entries in an exemplary Carrier Routing Table shown in FIGS. 1 and 2.

FIG. 5 shows exemplary entries in an exemplary Carrier Routing Table 120 shown in FIGS. 1 and 2.

In particular, as shown in FIG. 5, a first entry 488 indicates that communication between the Inter-Carrier service provider (ICSP) and the carrier "AT&T" is by SMTP protocol (i.e., e-mail), and that the phone number only short messages received for delivery to AT&T should be appended with the syntax "@mobile.att.net". A second entry 489 indicates that communication between the ICSP and the carrier "Verizon" is by SMTP protocol, and that short messages send with phone number only should be appended with the syntax "@mobile.myportal.xyzwireless.net".

The exemplary carrier routing table 120 shown in FIG. 5 may be extended to include a country of the carrier, allowing inclusion of necessary syntax (e.g., a country code appended to an email address), use of particular communication links, etc.

The advantages of a phone number only short messaging experience in accordance with the principles of the present invention can be readily appreciated when considering the alternatives (presuming that the sender knows the particular carrier associated with a recipient's phone number) of manual entry of the syntaxes such as "@mobile.myportal.xyzwireless.net".

Figure 6:
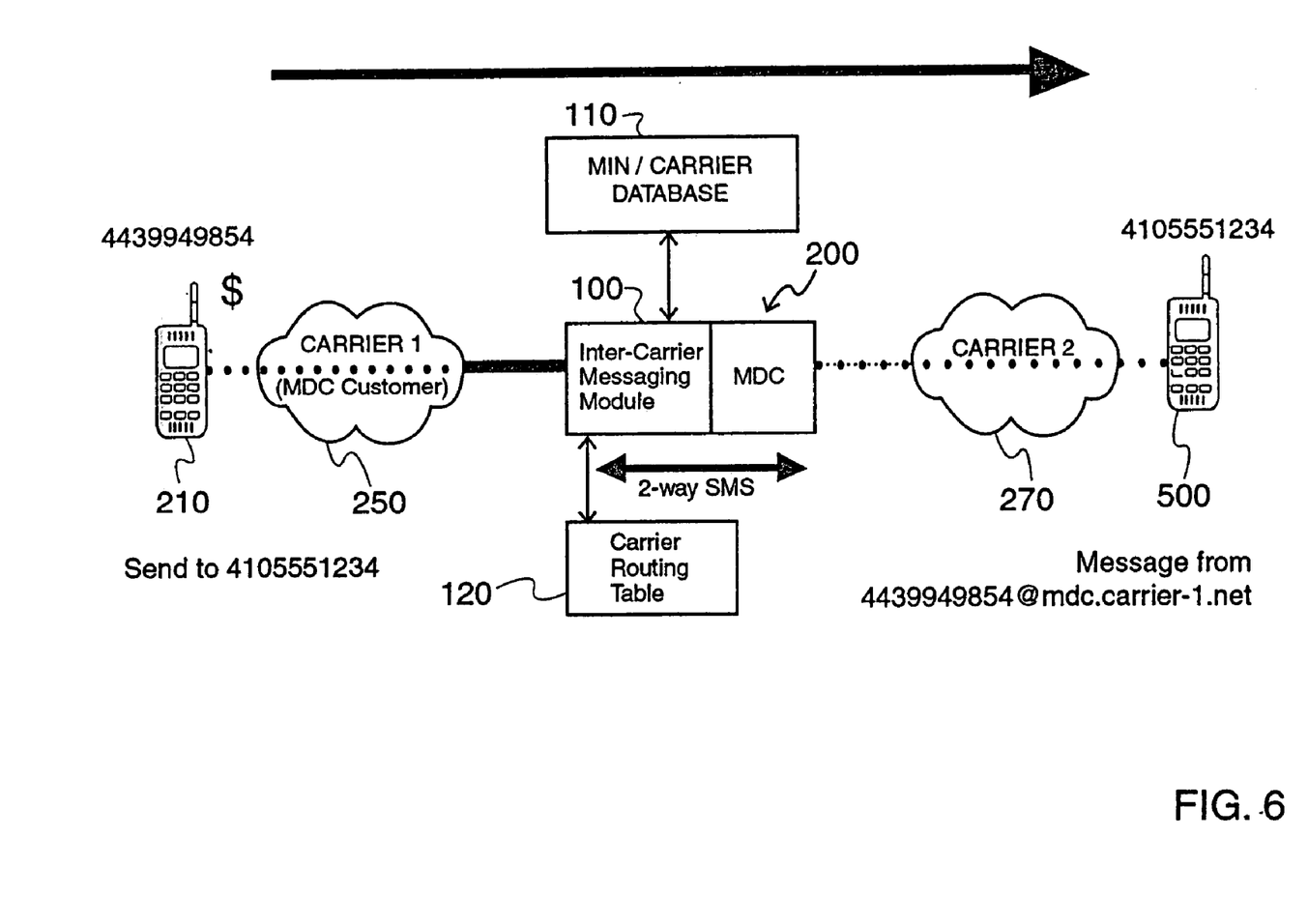
FIG. 6 depicts a phone number only experience for a subscriber of Carrier 1 to send a short message to a subscriber of another Carrier (e.g., which does not subscribe to the Service Bureau including the Inter-carrier Messaging Module), in accordance with the principles of the present invention.

FIG. 6 depicts a phone number only experience for a subscriber 210 of Carrier 1 250 to send a short message to a subscriber 500 of a different Carrier 2 270 (e.g., which does not subscribe to the ICSP (i.e., Service Bureau) including the Inter-carrier Messaging Module). In particular, as shown in FIG. 6, the subscriber 210 need only send a short message using the simple phone number 410-555-1234 of subscriber 500, with the Inter-Carrier messaging module 100 automatically determining the carrier provider servicing subscriber 500, the method of communication between the Inter-Carrier messaging module 100 of the MDC 200 and the carrier 2 270, and then adding (e.g., appending) the appropriate syntax to the phone number to actually address the short message to "410-555-1234".

In accordance with the principles of the present invention, the short message sent by subscriber 210 to subscriber 555 is preferably sent with the sender's address in phone number only form, to facilitate the reply of a phone number only short message back to the original subscriber 210. However, the present invention preferably accommodates reply short messages (and/or new short messages) to a subscriber 210 using the full, formal SMTP address such as "443-994-9854@mdc.carrier-1.net".

While the embodiments of the present invention relate to the addition of syntax to the end of a phone number (i.e., appending the syntax), the present invention relates equally to the addition of a prefix to the phone number, the insertion of syntax information within the phone number, and/or to the addition of suffix information at the end of the phone number.

Figure 7:
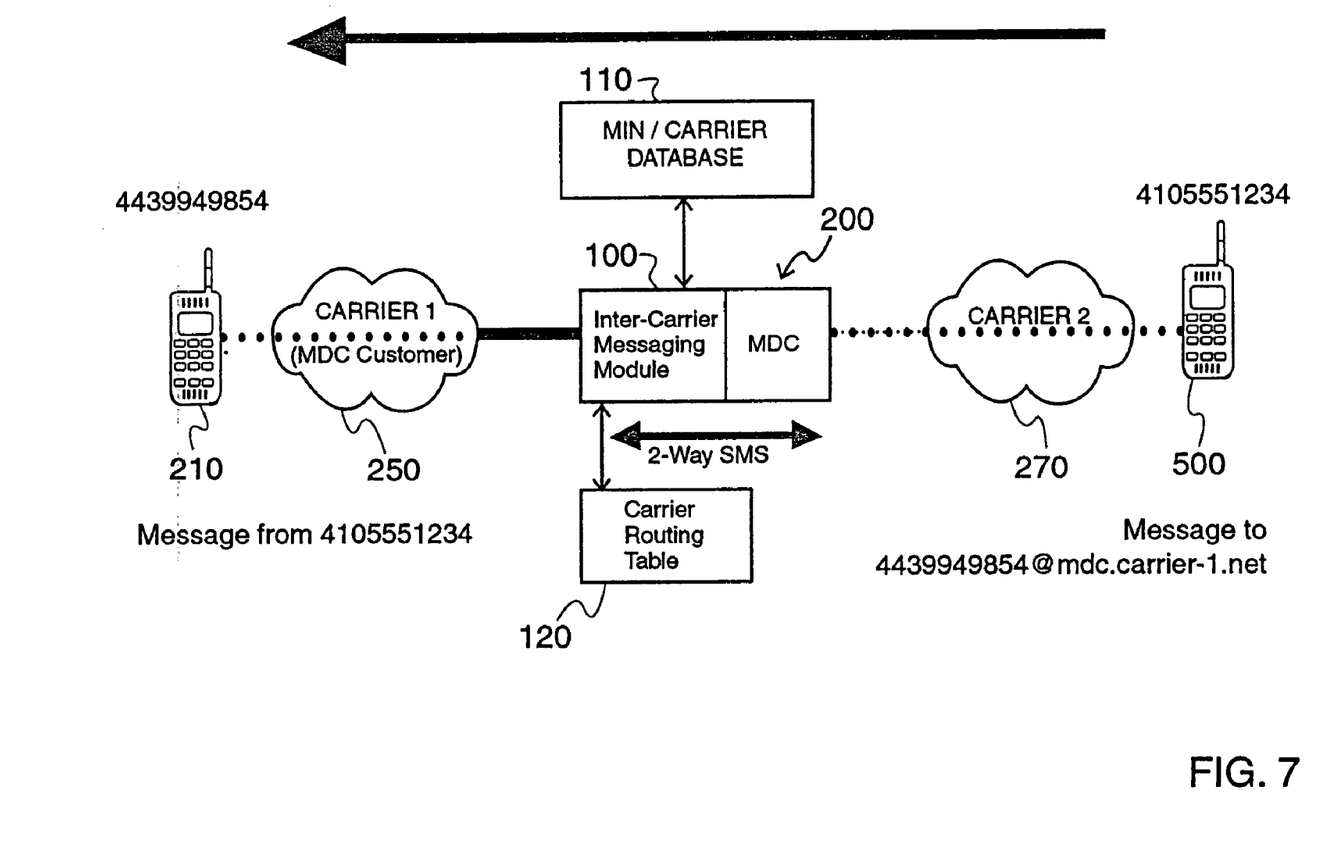
FIG. 7 depicts a phone number only experience for a subscriber of Carrier 1 to receive a short message from a subscriber of another Carrier (e.g., which does not subscribe to the Service Bureau including the Inter-carrier Messaging Module), in accordance with the principles of the present invention.

FIG. 7 depicts a phone number only experience for a subscriber 210 of Carrier 1 250 to receive a short message from a subscriber 500 of another Carrier 2 270, e.g., which does not subscribe to the ICSP or Service Bureau including the Inter-carrier Messaging Module 100 in accordance with the principles of the present invention.

In particular, subscriber 500 sends a short message addressed to 4439949854@mdc.carrier-1.net. This would conventionally arrive at the subscriber's mobile phone 210 indicating a source using more than simply a phone number, which violates the preferred embodiments of the present invention wherein a clean phone number only experience is desired.

To provide a phone number only experience in accordance with the present embodiment, the short message to subscriber 210 is routed through the Inter-Carrier messaging module 100, where the syntax in the source address of the short message is stripped down preferably to only the phone number. In this way, the subscriber 210 sees a short message which appears to them to have been sent by "4105551234".

In operation, with reference to FIG. 1, Carrier 1 250 receives a short message from a subscriber 210 with a destination address of a phone number only (i.e., MIN). The SMSC of the Carrier 250 reviews the intended destination of the short message. If the Carrier 250 does not recognize the phone number as being another subscriber of the Carrier 250, then the Carrier 250 dumps the short message with the phone number to the Inter-Carrier Messaging Module 100 of the MDC 200 over, e.g., an SMPP communication pathway.

The Inter-Carrier Messaging Module 100 accesses the MIN/Carrier database 110 to perform a MIN database lookup, which returns with the name of the carrier (e.g., Verizon) providing service to that phone number.

Thereafter, the Inter-Carrier Messaging Module 100 accesses the Carrier Routing Table 120 to determine how the MDC 200 communicates with the particular carrier returned from the MIN/Carrier database lookup (e.g., SMTP). Moreover, the Carrier Routing Table 120 also preferably returns the appropriate syntax to add to the phone number to properly route the short message (e.g., "@msg.myvzw.com")

With the appropriate syntax now in hand, the Inter-Carrier Messaging Module 100 assembles a new short message, including the phone number with syntax added (e.g., 4107033375@msg.myvzw.com), the body of the short message, the originator address, and optional parameters such as priority, expiration, etc.

Inclusion of the source address (i.e., phone number) provides the recipient with the ability to reply to the received short message. The source address could include the full address of the source, including both the phone number and the appropriate syntax, but this would result in a possible reply short message which would violate the desired phone number only experience for subscribers of certain carriers. Therefore, preferably, the source address in the originally sent short message is added such that any reply short message would be forced back through the MDC 200 including the Inter-Carrier Messaging Module, which would recognize the phone number of the new recipient, and would forward the short message with the syntax stripped off.

For instance, the source address of the original short message can be set at the phone number of the subscriber 210, together with the syntax of the MDC 200 (e.g., 4439110002@mdc.att.net). The Inter-Carrier Messaging Module 100 would copy the body of the reply short message coming from the non-subscribing carrier (i.e., with syntax included in the destination address), apply the optional parameters, perform another MIN table lookup, and routing table lookup, thus formulating a new short message, and deliver the reply short message back to the subscriber 210 of the customer carrier 250.

Figure 8:
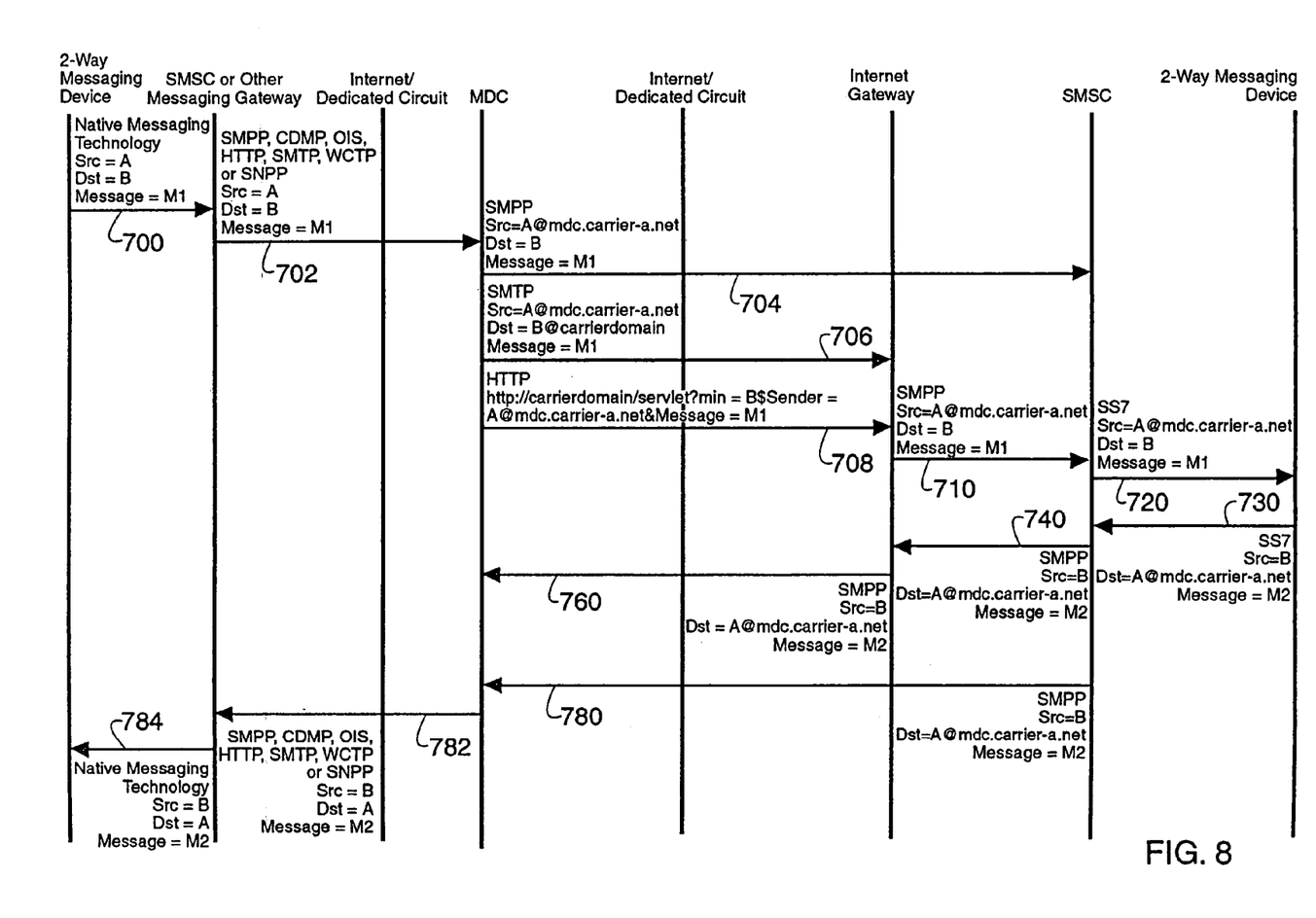
FIG. 8 is an exemplary detailed "call flow" representing an IP-based Inter-Carrier Short Message Service message transaction via a Message Distribution Center Inter-Carrier Messaging Service, in accordance with the principles of the present invention.

FIG. 8 is an exemplary detailed "call flow" representing an IP-based Inter-Carrier Short Message Service message transaction via a Message Distribution Center Inter-Carrier Messaging Service, in accordance with the principles of the present invention.

Step 700: Subscriber A originates a message to Subscriber B from their 2-way Messaging Device. The message is addressed to Subscriber B's phone number (i.e., to the subscriber's Mobile Identification Number (MIN) only.

Step 702: Carrier A's network elements identify non-Carrier A addresses and forwards them to the MDC via, e.g., SMPP, CDMP, OIS, Hypertext Transfer Protocol (HTTP) (i.e., the web), SMTP (i.e., e-mail), Wireless Communications Transport Protocol (WCTP)(i.e., paging networks), Simple Network Paging Protocol (SNPP), XML-RPC or TCP/IP socket API.

Step 704, or 706 or 708: As the MDC receives the message from Carrier A, it first determines the destination carrier (Carrier B) as well as the protocol supported by Carrier B. Then the MDC appends the MDC/Carrier A domain (mdc.carrier-a.net in the diagram) to Subscriber A's phone number and routes the message accordingly.

Step 710: Carrier B's wireless Internet gateway routes the message to carrier B's own SMSC.

Step 720: SMSC of Carrier B delivers message to subscriber B's 2-way messaging device via appropriate air interface (e.g., over an SS7 link).

Step 730: Subscriber B replies to the message. The message is routed to Carrier B's SMSC via appropriate air interface (e.g., over an SS7 link).

Step 740, 760 and 780: Depending upon the type of relationship enjoyed with the Carrier B, messages are either transported directly from Carrier B's SMSC to the MDC using SMPP (or other protocol) OR they are directed to Carrier B's Internet gateway using SMPP (or other protocol) and then onto the MDC using. SMTP or HTTP.

Step 782: The MDC receives a mobile originated message from Carrier B replying to the original message. The MDC routes the message to Carrier A's network.

Step 784: Carrier A's network receives the message and forwards it to Subscriber A's 2-Way Messaging Device.

Another function of the call flow shown in FIG. 8 is that it allows for delivery receipt notification between Carrier A's devices and Carrier B's devices which support delivery receipts.

Through the Message Linking feature, the MDC 200 determines the length of message supported by Carrier B and, if necessary, breaks lengthy messages into multiple linked messages.

The present invention allows 2-way pagers with querty keyboards to send short messages using phone number only addressing to any mobile phone (or to any other pager).

The phone number only capabilities of an Inter-Carrier Messaging Module and associated databases in accordance with the principles of the present invention has the capability to bridge non-SMS messaging devices, e.g., ReFlex and Mobitex pagers.

The present invention provides multiple benefits. For instance, simple "phone number only" SMS messaging across major carrier networks will add significantly to the continued adoption of SMS messaging particularly in the United States. Additionally, carriers can structure their pricing plans to recognize additional revenue from Inter-Carrier messages through the control and management of Inter-Carrier Messaging in accordance with the principles of the present invention.

Moreover, the present invention provides SMS traffic management and control, and a potential additional revenue stream for a carrier from international messaging.

The invention has particular use with respect to cellular and PCS carriers, and paging network operators (e.g., Verizon Wireless, AT&T Wireless, Sprint PCS, VoiceStream, SkyTel, etc.) in North America as well as other markets served by operators employing disparate air interface technologies.

While the invention has been described with reference to the exemplary embodiments thereof, those skilled in the art will be able to make various modifications to the described embodiments of the invention without departing from the true spirit and scope of the invention.

What is claimed is:

1. In a message distribution center, a system for processing a digital packet addressed with only a phone number comprising:
   a database associating subscriber phone numbers with servicing carriers;
   a database associating carriers with routing syntax; and
   an inter-carrier messaging module to receive a digital message packet addressed with only a phone number, to perform a lookup in said database associating subscriber phone numbers and in said database associating carriers with routing syntax, and to add routing syntax determined from said lookup to said phone number.

2. In a message distribution center according to claim 1, wherein:
   said digital message packet is an e-mail.

3. In a message distribution center according to claim 1, wherein:
   said database associating subscriber phone numbers with servicing carriers and said database associating carriers with routing syntax are in a common database.

4. In a message distribution center according to claim 1, wherein:
   said message distribution center forms a store and forward messaging platform.

5. In a message distribution center according to claim 1, wherein said digital message packet comprises:
   a short text message.

6. In a message distribution center, a method for processing a digital packet addressed with only a phone number comprising the steps of:
   receiving an initial digital message packet addressed to a phone number only;
   associating a carrier providing service to said phone number;
   formulating a new digital message packet including a body of said initial digital message packet and newly addressed to said phone number with a syntax associated with said carrier providing service to said phone number; and
   routing said new digital message packet.

7. The method of providing a phone number only experience to a subscriber according to claim 6, wherein:
   said initial digital message packet is an e-mail.

8. The method of providing a phone number only experience to a subscriber according to claim 7, wherein:
   said new digital message packet is an e-mail.

9. The method of providing a phone number only experience to a subscriber according to claim 6, wherein:
   said phone number only addressed digital message packet is received at, and said new digital message packet is routed from, a service bureau.

10. The method of providing a phone number only experience to a subscriber according to claim 6, wherein:
    said phone number with said added syntax associated with said carrier providing service to said phone number forms a routable address.

11. The method of providing a phone number only experience to a subscriber according to claim 10, wherein:
    said routable address is an e-mail address.

12. The method of providing a phone number only experience to a subscriber according to claim 6, wherein said new digital message packet comprises:
    a short text message.

13. The method of providing a phone number only experience to a subscriber according to claim 6, wherein:
    said new digital message packet is routed using an SMTP protocol.

14. In a message distribution center, as apparatus for providing a digital packet addressed with only a phone number comprising:
    means for receiving an initial digital message packet addressed to a phone number only;
    means for associating a carrier providing service to said phone number;
    means for formulating a new digital message packet including a body of said initial digital message packet and newly addressed to said phone number with a syntax associated with said carrier providing service to said phone number; and
    means for routing said new digital message packet.

15. The apparatus for providing a phone number only experience to a subscriber according to claim 14, wherein:
    said initial digital message packet is an e-mail.

16. The apparatus for providing a phone number only experience to a subscriber according to claim 15, wherein:
    said new digital message packet is an e-mail.

17. The apparatus for providing a phone number only experience to a subscriber according to claim 14, wherein:
    said phone number only addressed digital message packet is received at, and said new digital message packet is routed from, a service bureau.

18. The apparatus for providing a phone number only experience to a subscriber according to claim 14, wherein:
    said phone number with said added syntax associated with said carrier providing service to said phone number forms a routable address.

19. The apparatus for providing a phone number only experience to a subscriber according to claim 18, wherein:
    said routable address is an e-mail address.

* * * * *

Disclaimer

6,985,748—Chris Knotts, Glen Burnie, MD. INTER-CARRIER MESSAGING SERVICE PROVIDING PHONE NUMBER ONLY EXPERIENCE, Patent dated Jan. 10, 2006. Disclaimer filed May 21, 2009, by the assignee TeleCommunication Systems Inc.

Hereby enters this disclaimer to claims 2, 7, 8, 15 and 16 of said patent.

*(Official Gazette, March 2, 2010)*